(12) United States Patent
Wang (10) Patent No.: US 11,711,573 B1
(45) Date of Patent: Jul. 25, 2023

(54) 1-CLICK REVERSIBLE STORY

(71) Applicant: TCL RESEARCH AMERICA INC., San Jose, CA (US)

(72) Inventor: Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 0 days.

(21) Appl. No.: 17/727,199

(22) Filed: Apr. 22, 2022

(51) Int. Cl.
*H04N 21/4402* (2011.01)
*H04N 21/472* (2011.01)

(52) U.S. Cl.
CPC ..... *H04N 21/44029* (2013.01); *H04N 21/472* (2013.01)

(58) Field of Classification Search
CPC ............... H04N 21/44029; H04N 21/472
See application file for complete search history.

(56) References Cited

U.S. PATENT DOCUMENTS

| | | | |
|---|---|---|---|
| 5,960,411 A | 9/1999 | Hartman et al. | |
| 8,595,773 B1 | 11/2013 | Wang et al. | |
| 8,831,902 B2 | 9/2014 | Wang | |
| 8,856,845 B2 | 10/2014 | Wang | |
| 8,869,211 B2 | 10/2014 | Wang | |
| 8,964,127 B2 | 2/2015 | Wang | |
| 9,100,701 B2 | 8/2015 | Wang | |
| 9,866,913 B1 | 1/2018 | Wang | |
| 10,860,649 B2 | 12/2020 | Wang | |
| 11,122,335 B2 | 9/2021 | Wang | |
| 2014/0082666 A1* | 3/2014 | Bloch | G06F 3/04842 725/37 |
| 2017/0245023 A1* | 8/2017 | Brelis | H04N 21/4627 |

OTHER PUBLICATIONS

H. Wang, etc., "A New TV World for Kids—When ZUI Meets Deep Learning", in Proc. IEEE MIPR 2018.

\* cited by examiner

*Primary Examiner* — Kunal Langhnoja
(74) *Attorney, Agent, or Firm* — Anova Law Group, PLLC (57) ABSTRACT

A method and device for reversible story are provided. The method includes: when presenting a media stream of a current story, detecting a request performed by a user for generating an alternative story corresponding to the current story; in response to the request for generating the alternative story, determining a target path in a hyperstory, the hyperstory including multiple paths corresponding to multiple stories that describe different status change trends of one or more story characters, and the target path sharing a same initial segment with a path of the current story in the hyperstory and including a branch point where a story trend change occurs; determining a media stream of the alternative story according to the target path; and presenting the media stream of the alternative story.

14 Claims, 5 Drawing Sheets

Determining the current vertex corresponding to the moment of detecting the request for generating the alternative story — 4042

Identifying, according to the DAG representation of the hyperstory, candidate paths of alternative stories corresponding to the current vertex — 4044

Determining a request-realization-distance (RRD) between the current vertex and each branch-out vertex — 4046

Determining a candidate path with a branch-out vertex corresponding to the minimum RRD as the target path — 4048

FIG. 8

1-CLICK REVERSIBLE STORY

FIELD OF THE DISCLOSURE

The present disclosure relates to the field of media processing technologies and, more particularly, relates to a method and device for generating a reversible story.

BACKGROUND

It has been always an intriguing research topic on how to make user experiences as simple and effective as possible. Amazon's invention of 1-click purchasing was a legend, which has been widely used in the past two decades. In some mobile apps, for example, in FLIPBOARD, user can use a single action "flip" to walk away from a news that he/she is not interested and move on to the next; in TIKTOK or WECHAT video, the user can use a single action to swap to the next video. This is possible because all these media data (i.e., news, videos) are separated pieces and are aggregated together in one place, thus the system can prepare for the next recommendation in order to get ready for the user's single action gesture to walk away.

When a user watches a story video (or listens to a story audio, or experiences a story VR), it would be ideal that the user can have the similar single-action capability to dictate the story direction. However, such experiences is not available in the media playing field, because this expectation demands a huge number of branches and endings for the story, which is much harder than aggregating a number of irrelevant stories together as in the example of FLIPBOARD or TIKTOK.

BRIEF SUMMARY OF THE DISCLOSURE

One aspect of the present disclosure provides a method for reversible story. The method includes: when presenting a media stream of a current story, detecting a request performed by a user for generating an alternative story corresponding to the current story; in response to the request for generating the alternative story, determining a target path in a hyperstory, the hyperstory including multiple paths corresponding to multiple stories that describe different status change trends of one or more story characters, and the target path sharing a same initial segment with a path of the current story in the hyperstory and including a branch point where a story trend change occurs; determining a media stream of the alternative story according to the target path; and presenting the media stream of the alternative story.

Another aspect of the present disclosure provides a device, including a memory and a processor coupled to the memory. The processor is configured to perform a plurality of operations including: The method includes: when presenting a media stream of a current story, detecting a request performed by a user for generating an alternative story corresponding to the current story; in response to the request for generating the alternative story, determining a target path in a hyperstory, the hyperstory including multiple paths corresponding to multiple stories that describe different status change trends of one or more story characters, and the target path sharing a same initial segment with a path of the current story in the hyperstory and including a branch point where a story trend change occurs; determining a media stream of the alternative story according to the target path; and presenting the media stream of the alternative story.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The present disclosure provides a method and device for one-click filmmaking. The disclosed method and/or device can be applied in any proper occasions where film making is desired.

Figure 1:
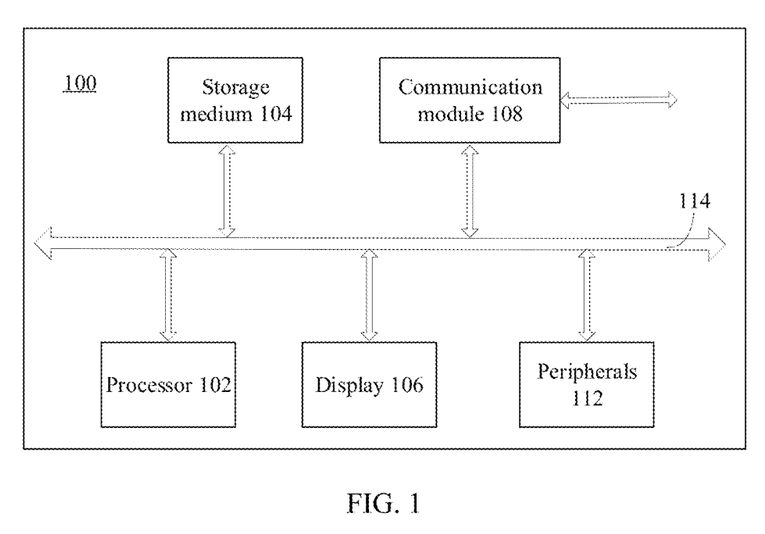
FIG. 1 is a block diagram of an exemplary computing system according to some embodiments of the present disclosure.

FIG. 1 is a block diagram of an exemplary computing system/device capable of implementing the disclosed one-click reversible story generation method according to some embodiments of the present disclosure. As shown in FIG. 1, computing system 100 may include a processor 102 and a storage medium 104. According to certain embodiments, the computing system 100 may further include a display 106, a communication module 108, additional peripheral devices 112, and one or more bus 114 to couple the devices together. Certain devices may be omitted and other devices may be included.

Processor 102 may include any appropriate processor(s). In certain embodiments, processor 102 may include multiple cores for multi-thread or parallel processing, and/or graphics processing unit (GPU). Processor 102 may execute sequences of computer program instructions to perform various processes, such as a program for generating a reversible story in response to one-click user instruction, etc. Storage medium 104 may be a non-transitory computer-readable storage medium, and may include memory modules, such as ROM, RAM, flash memory modules, and erasable and rewritable memory, and mass storages, such as CD-ROM, U-disk, and hard disk, etc. Storage medium 104 may store computer programs for implementing various processes, when executed by processor 102. Storage medium 104 may also include one or more databases for storing certain data such as hyperstory representation structure, media streams, user preferences, and certain operations can be performed on the stored data, such as database searching and data retrieving.

The communication module 108 may include network devices for establishing connections through a network. Display 106 may include any appropriate type of computer display device or electronic device display (e.g., CRT or LCD based devices, touch screens). Peripherals 112 may include additional I/O devices, such as a keyboard, a mouse, and so on.

In operation, the processor 102 may be configured to execute instructions stored on the storage medium 104 and perform various operations related to a one-click reversible story generation method as detailed in the following descriptions.

Figure 2:
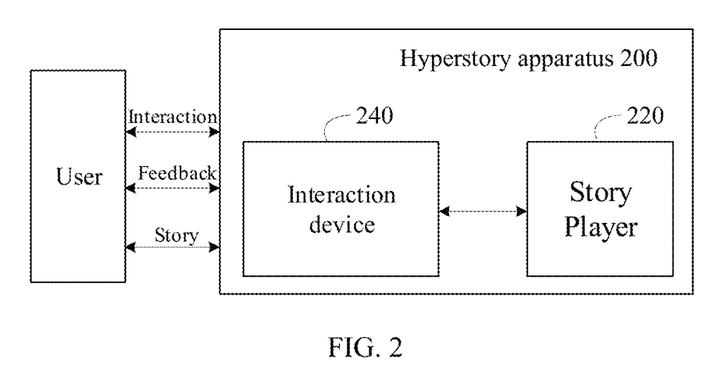
FIG. 2 is a schematic diagram of a hyperstory apparatus consistent with some embodiments of the present disclosure.

FIG. 2 is a schematic diagram of a hyperstory apparatus consistent with some embodiments of the present disclosure. The hyperstory apparatus may be implemented by the computing system 100 shown in FIG. 1. As shown in FIG. 2, the hyperstory apparatus 200 includes a story player 220 and an interaction device 240 communicatively coupled to the story player 220. The interaction device 240 and the story player 220 can communicate with each other through a wired or wireless connection. The wireless connection can include WiFi, Bluetooth, Zigbee, LTE, or the like. In one embodiment, the story player 220 and the interaction device 240 can be implemented by a single device. In another embodiment, the story player 220 and the interaction device 240 can be separated devices.

The story player 220 can be configured to present a story in one or more media formats. The media format can be audio, video, augmented reality (AR) media, virtual reality (VR) media, etc. The story player 220 can include a TV, an audio player, a mobile phone, a tablet, a VR device, an AR device, etc. The TV may be a smart TV, a mobile-based TV, a PC-based TV, a projection-based TV, a set-top-box/stick based TV, or the like. The story can be a hyperstory. A hyperstory in the present disclosure refers to a network of narratives (stories) with a branching structure in which plot (story trend) changes can occur at various points/branches of the narratives. In some embodiments, the story trend change can be described by status change of one or more characters in the hyperstory.

The story player 220 can be configured to provide a rewind function and/or a fast-forward function when presenting a story. Activating the rewind function makes the story go back inversely according to a playback path. Activating the fast-forward function makes the story follows a pre-assigned playback path with a faster speed.

The interaction device 240 can be configured to receive an interaction from a user and send the interaction to the story player 220. The interaction can be inputted by the user at any time. In some embodiments, the interaction can indicate a user's intent to change a trend of a story presented by the story player 220. The interaction may be detected when the story player 220 is playing the story, rewinding the story, or fast-forwarding the story. The interaction to change the trend may be a single action. The single action performed by the user and received by the interaction device 240, also called a one-click action, can be, for example, clicking a button, pressing a key, a touching operation on a screen, making a gesture, voicing a command, and so on. The single action may be pre-defined. For example, when the interaction device 240 detects the pre-defined single action while an original story is played, the story player 220 may correspondingly generate an alternative story having a different story trend from the original story and play the generated story. The alternative story may share a same/similar story line at the beginning with the original story, but branch out at a certain spot in the playback progress to develop a different story trend.

In some embodiments, the interaction may include any desired operation related to the story, for example, rewind, fast-forward, changing a character's arc (e.g., a journey of the character over a course of a story), making a choice for the character, adding a new event, or the like.

In some embodiments, after receiving a request to change story trend, the interaction may include receiving a cancelation request. The cancelation request may be received before the playback progress reaches the branch spot corresponding to the alternative story. In some embodiments, the cancelation request may be a single action (i.e., one-click action). The one-click action for the cancellation request may be the same as the one-click action for changing the story trend, or may be another action different from the one-click action for changing the story trend. In some embodiments, when the hyperstory apparatus 200 detects the cancelation request before the change takes place (i.e., the playback progress has not reached the branch spot corresponding to the alternative story), the hyperstory apparatus 200 can play the original story instead of the alternative story, otherwise, the hyperstory apparatus 200 can guide the story to the alternative branch as planned.

In some embodiments, the interaction device 240 can be a device having a microphone, for example, a mobile phone, a mobile device having a built-in microphone, an internet of things (IoT) having a microphone (e.g., an IoT toy), or the like. The microphone of the interaction device 240 can receive the voice command from the user.

In some embodiments, the interaction device 240 can be a device having a touch screen, for example, a mobile phone, a tablet, or the like. The touch screen can include a touch panel for receiving the interaction from the user. The user can input the interaction by touching the touch screen with an external object, such as a finger of the user or a stylus.

In some embodiments, the interaction device 240 can be a remote controller or a mouse. The user can select a menu option by clicking a key of the remote controller or using the mouse.

In some embodiments, the interaction can include a hand gesture or body gesture. The interaction device 240 can be a device having a camera, such as a mobile phone, a tablet, or the like. The camera can capture the gesture of the user. For example, the user can use a single hand/body gesture to initiate a change on the story.

In some embodiments, the interaction can include a head movement or an eye movement. The interaction device 240 can be a head-mount device, such as, a virtual reality (VR) headset, an augmented reality (AR) headset, smart glasses, or the like. In some embodiments, the head-mount device may include an inertial measurement unit (IMU). The IMU can include at least one inertial sensor, such as, an accelerometer, a gyroscope, a magnetometer, or the like. Thus, the head-mount device can track the head movement in Three Degrees of Freedom (3 DoF), for example, three rotational movements (i.e., rolling, pitching, and yawing). In some other embodiments, the head-mount device may include a camera. Thus, the head-mount device can track the eye movement. For example, the user can use a head movement and/or eye movement to initiate a single selection to initiate story trend change.

In some embodiments, functions of the interaction device 240 can be integrated into the story player 220, and thus the interaction device 240 can be bypassed or omitted. For example, the story player 220 can have a build-in microphone, such that the story player 220 can directly receive the voice command from the user. As another example, the story player 220 can have a build-in camera, such that the story player 220 can directly receive the hand gesture, the head movement, or the eye movement of the user.

In some embodiments, the story player 220 can be configured to receive the interaction from the interaction device 240 via the wired or wireless connection. In some other embodiments, the story player 220 can be configured to directly receive the interaction from the user without passing the interaction device 240. After receiving the interaction of the user, the story player 220 can be further configured to generate a story with a different story trend from the original story and play the generated story.

In some embodiments, the story player 220 can be further configured to send a feedback message to notify the user about that, for example, the story change is coming and by when to occur. In some embodiments, the story player 220 can send the feedback message to the interaction device 240, and the interaction device 240 can output the feedback message to the user. The feedback message can be outputted in any suitable format, for example, a voice feedback message, a text feedback message, or the like. In some other embodiments, the story player 220 can send the feedback message directly to the user via, for example, a screen of the story player 220. For example, for device with (associated) screen, it can show something like "Requested change occurs in XX seconds" on the screen, for device without screen but with audio, it can either notify user via their mobile phone, or use audio to periodically notify user: "Requested change occurs in XX seconds".

Figure 3:
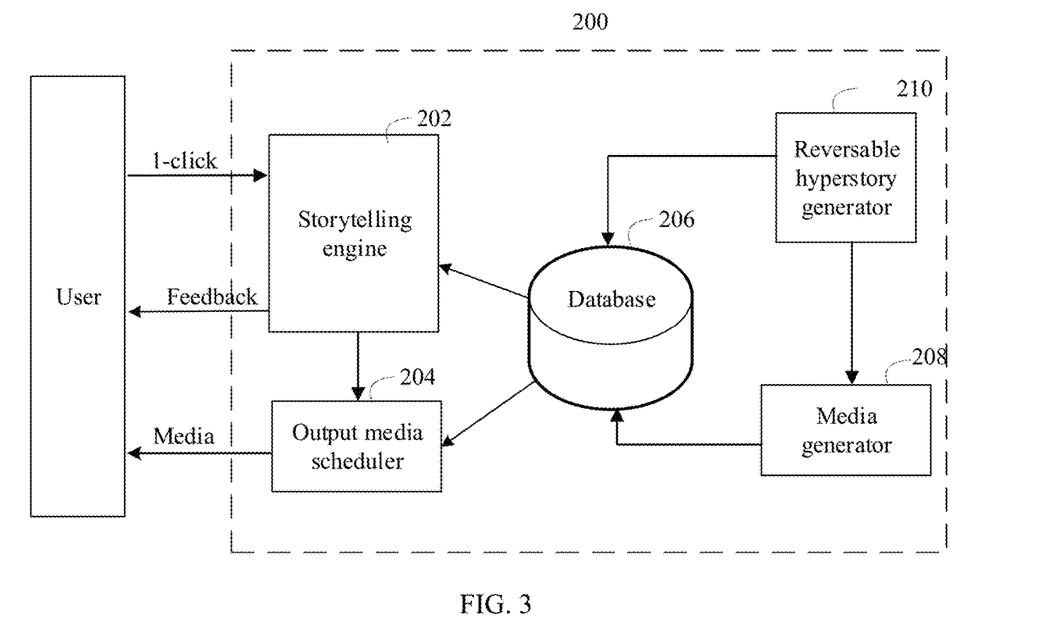
FIG. 3 is another schematic diagram of a hyperstory apparatus consistent with some embodiments of the present disclosure.

FIG. 3 is another schematic diagram of a hyperstory apparatus 200 consistent with some embodiments of the present disclosure. As shown in FIG. 3, the hyperstory apparatus 200 includes a storytelling engine 202, a reversable hyperstory generator 210, a media generator 208 coupled to the reversable hyperstory generator 210, an output media scheduler 204 coupled to the storytelling engine 202, and a database 206 coupled to the storytelling engine 202, the reversable hyperstory generator 210, the media generator 208, and the output media scheduler 204. It should be noted that the components of the hyperstory apparatus 200 shown in FIG. 3 form a conceptual diagram that does not require all components to be in the same physical device. In some embodiments, one or more of the components can be implemented either in the device software, or as a cloud service that the device software can access and use.

In operation, the reversable hyperstory generator 210 produces a hyperstory with multiple stories corresponding to multiple paths. The media generator 208 takes input from the hyperstory generator 210 and create media streams accordingly. The storytelling engine 202 decides a story path to be used for presentation. The output media scheduler 204 is configured to dynamically schedule the media streams according to the decision of storytelling engine, and pass the proper media stream to be presented. When a user makes a one-click action for changing a current story trend, the built-in storytelling engine 202 can manage to find the best alternative branch/path for the current story, and notify the user with a feedback message about when the change is going to be arranged. The output media scheduler 304 can make sure the media corresponding to the alternative story branch be available and ready to stream to the user at the right timing.

Figure 4:
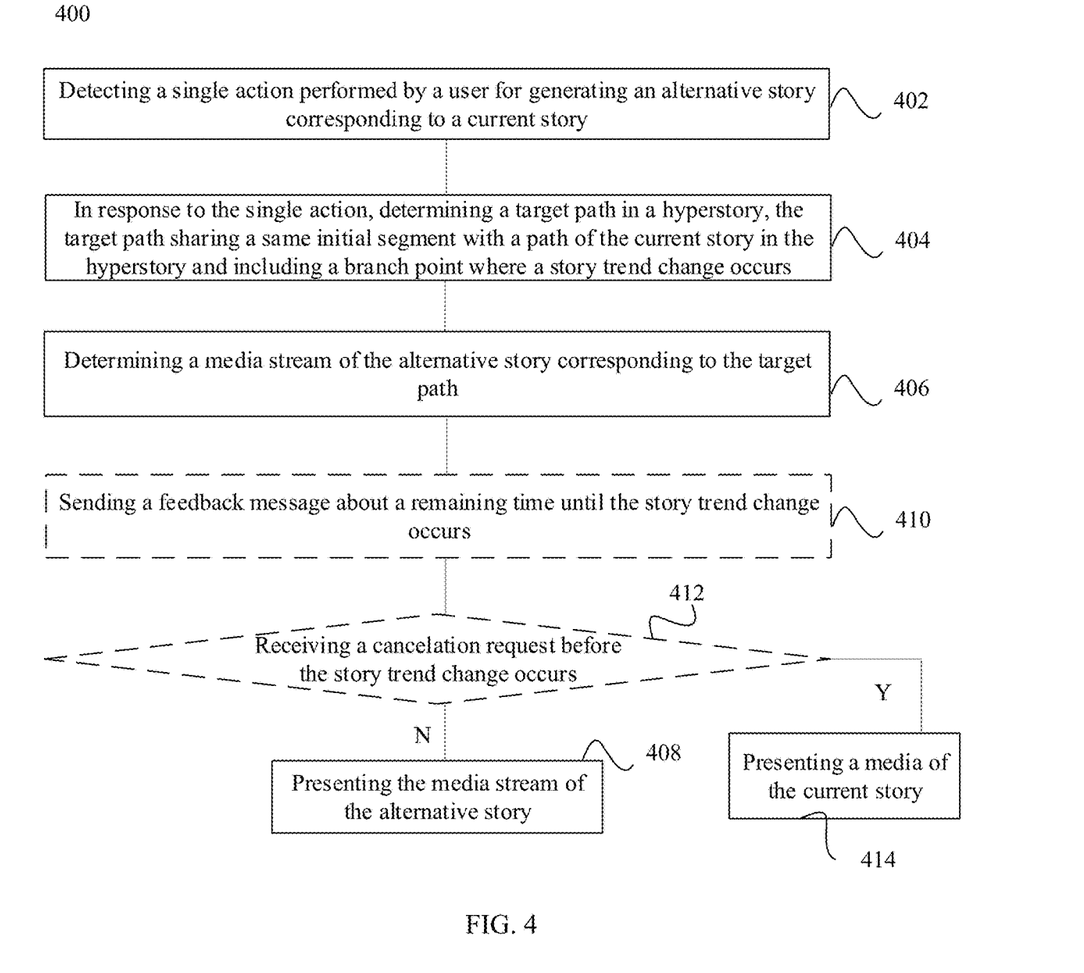
FIG. 4 is a schematic flow chart of a story generation method consistent with certain embodiments of the present disclosure.

The hyperstory apparatus 200 can be configured to perform a method consistent with the disclosure, such as, one of the example methods described below. FIG. 4 is schematic flow chart of a story generation process 400 consistent with certain embodiments of the present disclosure.

The hyperstory apparatus 200 (e.g., the interaction device 240) can detect a single action performed by a user for generating an alternative story corresponding to a current story (S402). When the user consumes the current story (e.g., when the story player 220 is presenting the current story), the user has an option anytime (until the end of the story) to perform the single action, namely one-click action, to express their willingness to change the trend of the story. The single action can be any proper action detectable by the hyperstory apparatus 200, such as clicking a button, pressing a key, touching a screen, making a gesture, voicing a command, and so on. The hyperstory apparatus 200 may also record a timestamp of receiving/detecting the single action. The timestamp indicates a playback progress of the current story. The current story belongs to a hyperstory.

In response to the single action, the hyperstory apparatus 200 can determine a target path in the hyperstory, the target path sharing a same initial segment with a path of the current story in the hyperstory and including a branch point where a story trend change occurs (S404). For example, when the one-click action is received, the hyperstory apparatus 200 can call/execute a branch selection algorithm to find out a branch candidate of the story. For example, the reversible hyperstory generator 210 may obtain a hyperstory with multiple paths corresponding to the hyperstory and the storytelling engine 202 may determine the target path from the multiple paths of the hyperstory in response to the user action:

The key difference of a hyperstory and a story is that the hyperstory contains many stories inside, and each story has a unique path depending on options that a hyperstory developer creates and choices that story characters may take. The hyperstory can be manually generated by a story writer, automatically generated by a computing device, or semi-automatically generated by the computing device with clues/interactions provided by the story writer. The hyperstory developer can be human, computer, or a combination of human and computer.

Figure 5:
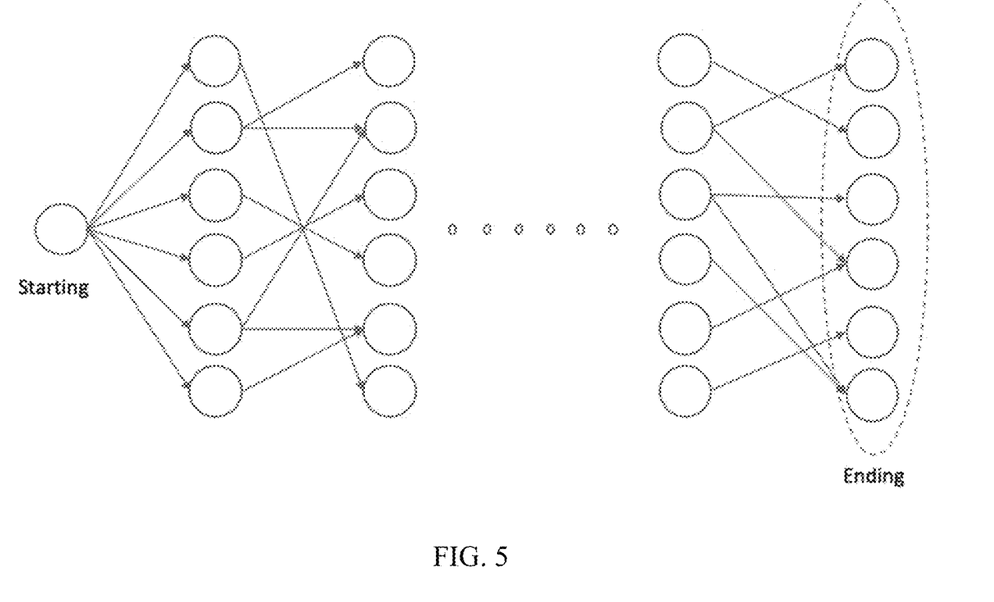
FIG. 5 schematically shows a representation of a hyperstory consistent with some embodiments of the present disclosure.

In some examples, the hyperstory can be understood as multiple sequences of concatenated functions. In some examples, the hyperstory can be represented using a directed acyclic graph (DAG). FIG. 5 schematically shows a representation of the hyperstory consistent with some embodiments of the present disclosure. As shown in FIG. 5, each vertex in the DAG represents a status of one of main characters of the hyperstory, and a directed edge from one vertex to another refers to an event that causes a status change of the corresponding character. As shown in FIG. 5, the DAG has a single starting vertex, because a setting of all stories contained in the hyperstory are the same at the beginning, but the DAG has more than one end vertices due to the fact that many endings for various stories can be generated during a story creation process. Any one of the paths from starting vertex to the end vertices could be a possible story as long as the basic criteria of a good story can be satisfied. The edges from one vertex to multiple vertices can be considered as multiple branches of the story graph.

Take a well-known movie/story, Lion King as an example, to demonstrate a DAG structure in FIG. 5. In the Lion King story, there are 3 main characters, namely Mufasa, Scar and Simba. The story touches heavily on 2 layers of the Maslow's hierarchy of needs theory, i.e., Kingship and Live/Death. It is defined that Kingship=0 means not thinking of kingship, 1 means eager to get kingship, and 2 means securing kingship. It is also defined that Live=0 means dead, 1 means in danger, and 2 means live without immediate danger, such that the status of all 3 characters can be represented by a 6-tuple consists of Kingship and Live value of all 3 characters Mufasa, Scar and Simba.

Table 1 shows example story segments and associated statuses according to the above story settings. As shown in Table 1, a portion of the story with 7 segments (or steps) are demonstrated, where the associated statuses are marked as well.

TABLE 1

Story segments and associated statuses

| No | Segment/Step | Status |
|---|---|---|
| 1 | Scar sets a trap for his brother and nephew by luring Simba into a gorge | 221202 |
| 2 | Simba is trampled by a large herd of wildebeest driven by the hyenas | 221201 |
| 3 | Mufasa is informed by Scar of Simba's peril, and saves Simba | 221202 |
| 4 | Mufasa ends up hanging perilously from the gorge's edge | 211202 |
| 5 | Scar sends Mufasa falling to his death | 001202 |
| 6 | Scar convinces Simba that the tragedy was Simba's own fault, and orders hyenas to kill the cub | 001201 |
| 7 | Scar steps forward as the new king | 002201 |

Each associated status is represented by the 6-tuple in an order of Kingship of Mufasa, Live of Mufasa, Kingship of Scar, Live of Scar, Kingship of Simba, and Live of Simba. Take the story segment 1 as an example, Mufasa is still the King and alive in segment 1, so Kingship of Mufasa equals to 2 and Live of Mufasa equals to 2. Scar is not the King but eager to get the kingship and he is alive in segment 1, so Kingship of Scar equals to 1 and Live of Mufasa equals to 2. Simba is not thinking of the kingship and he is alive in segment 1, so Kingship of Simba equals to 0 and Live of Simba equals to 2. As such, as shown in Table 1, the associated status for the story segment 1 is 221202.

Figure 6:
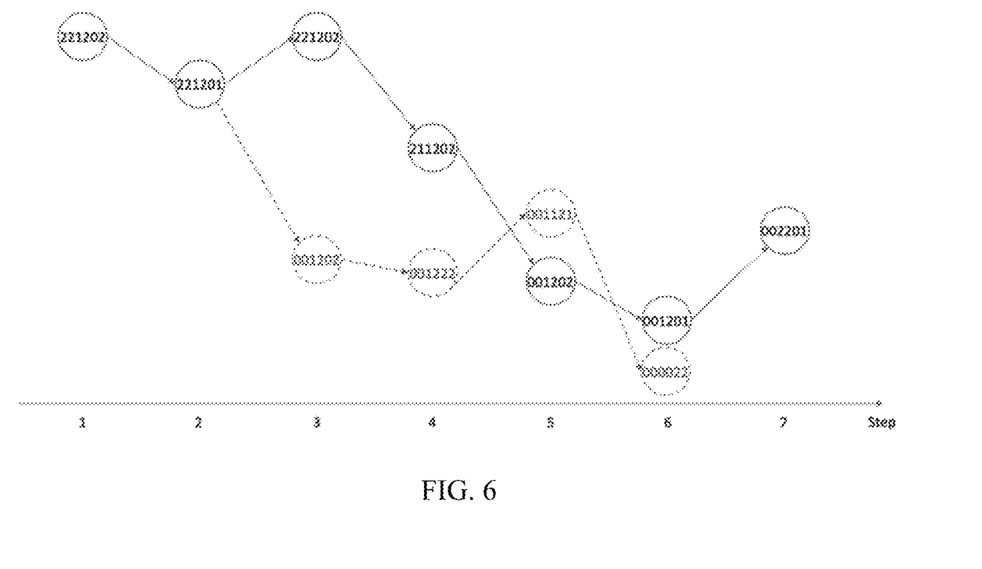
FIG. 6 schematically shows an example DAG representation of a Lion King hyperstory consistent with one embodiment of the present disclosure.

FIG. 6 schematically shows an example DAG representation of a Lion King hyperstory consistent with one embodiment of the present disclosure. As shown in FIG. 6, the example DAG representation includes two paths. Story segments in the path shown in solid line is consistent with Table 1. Each vertex represents an associate status of a story segment in each step and each edge represents a transaction from one status to another.

As shown in FIG. 6, by adding the vertices and edges in dashed lines, a new story can be generated as an example. From the status transaction, a story line between two adjacent steps can be completed. For example, from (221201) at step 2 to (001202) at step 3, it may refer that Mustafa saved Simba but lost his own life. As another example, from (001202) at step 3 to (001222) at step 4, it may refer that Simba steps forward as the new King. It can be appreciated that a space of the new story generation is huge in the DAG structure, which is relevant to the number of the steps of the hyperstory. In addition, durations of different stories in the hyperstory may vary even the number of steps of the stories is fixed, which is highly relevant to an actual performance time according to these steps and an edit and cut process in the video postprocessing stage. New story path can be added into the hyperstory in a scalable manner either by manual story creation or by automation.

In some embodiments, referring to FIG. 3, the reversable hyperstory generator 210 can be configured to generate the hyperstory or obtain the hyperstory from database 206. The hyperstory refers to a network of story plots or a story graph including various branches. Each branch can correspond to an option the reversable hyperstory generator 210 creates or a choice the characters or a user may choose. Therefore, each sequential story has a unique path in the story graph with a network of story plots (character choices/status). The path can consist of a sequence of branches depending on options the reversable hyperstory generator 210 creates and/or choices the characters choose. The hyperstory can be generated manually or can be automatedly generated by a computer. The hyperstory may be generated before the single action for generating an alternative story is detected.

The reversible hyperstory generator 210 can be also configured to send the hyperstory to the database 206 and the database 206 can be configured to store the hyperstory, such that other components of the hyperstory apparatus 200, such as the storytelling engine 202, the output media scheduler 204, or the like, can retrieve the hyperstory from the database 206.

Provided that N denotes the number of steps in a hyperstory, it can be understood that N can be a small number if only the key development of the character status changes are considered. Alternatively, N can be a large number when actions of characters and emotional changes are zoomed-in and more factors are considered in the state of characters. Further, the hyperstory can be divided into N steps and in average media stream of each step occupies at most a threshold duration (e.g., one minute or even less), the continuous world of time can be converted into a discrete world of steps. On the other hand, the number of all possible status of a character is limited. Provided that M denotes the number of all combination of character status, the DAG space demonstrated in FIG. 5 can be represented by a vertex matrix of size M*N as illustrated in FIG. 7.

Provided that $V_{i,j}$(i<N, j<M) denotes a vertex at the ith column and jth row in the DAG matrix (e.g., the DAG shown in the FIG. 7), and Next($V_{i,j}$) denotes a function to specify a next node/vertex on a story path that a story creator has determined/generated. For example, in FIG. 7, point A is marked as an example vertex corresponding to the current point when 1-click request is made, and the vertices B, C, and D are the in the default path that can be derived using the Next()function. Identifying candidate paths corresponding to the one-click action (e.g., performed by the storytelling engine 202) can be described as a problem of: given a current 1-click request made at a time corresponding to step x and an associate current vertex $V_{x,y}$, a vertex $V_{rx,ry}$ and a path that bridges $V_{x,y}$ and $V_{rx,ry}$ are required to be selected from all the possibilities to realize the request. It can be understood that $V_{rx,ry}$ is a vertex at a step occurred later than step x in the DAG matrix.

Figure 7:
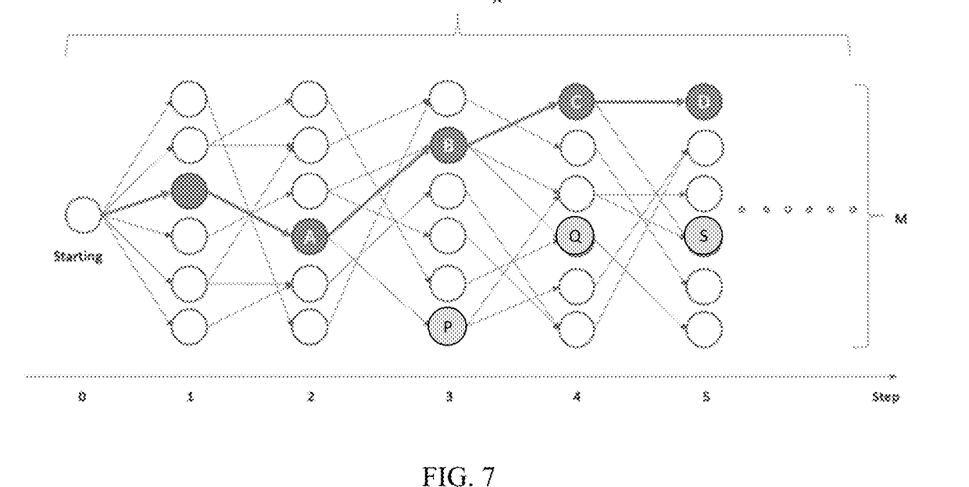
FIG. 7 schematically shows a current path and candidate paths in an example DAG representation of a hyperstory consistent with some embodiments of the present disclosure.

In the example shown in FIG. 7, when vertex A corresponds to the moment that the one-click request is made, vertices P, Q, and S are all possible realization points. That is, candidate paths include A->P, A->B->Q, A->B->C->S. The target path selection process aims to determine a target vertex from all possible realization points (e.g., P, Q, and S) and a single path from vertex A to the target vertex. In some embodiments, the realization point can be selected such that the new story path is very different from the default path.

The storytelling engine 202 is configured to determine how to respond to the user's request (e.g., select the target path) based on existing availability of the stories in the hyperstory (e.g., the stories represented by different paths in the hyperstory DAG representation). Multiple factors can be considered and balanced, to find the best story branch to meet user's expectation as well as the best path to get to there. The factors may include, for example, realization latency (i.e., the duration between the request is made and a realization media is delivered) and response-to-request confidence level, and so on. After a decision of the target path is made, the storytelling engine 202 can notify the user about how long his/her request is going to be realized and/or what level of confidence is the newly generated story. In some embodiments, the story branch selection (also called target path selection process) is a best effort approach, that is, depending on the availability of story branches, the storytelling engine 202 is configured to search an optimal solution and notify user sometimes even if the confidential level is not high enough. Details of the target path selection process will be described below in accordance with FIG. 8.

Referring to FIG. 4, the hyperstory apparatus 200 can determine a media stream of the alternative story corresponding to the target path (S406). Using the hyperstory representation in FIG. 6 as an example, media streams of the 11 story segments are generated according to their respective associated status. The two stories represented by the solid line path and dashed line path share media streams of the first 2 story segments and branch out at step 3 to develop different story trends. Assume the current story being presented corresponds to the solid line path and the dashed line path is selected as the target path, the media stream of the alternative story is determined to be a sequential combination of media streams of the 4 story segments connected by dashed lines from step 3 to step 6, namely (001202), (001222), (001121), (000022).

In order to make a story in text format deliverable to the user in media format, such as audiobook, movie, animation or others, an automatic (or semi-automatic) workflow can be executed to generate a media from a screenplay or other formats of a story. For example, the media generator 208 takes input from the hyperstory generator 210 and create media streams accordingly. In some embodiments, the generated media can be stored in the database 206. In some embodiments, the media of story segments of the hyperstory can be generated and stored before the user action for changing is received. In some embodiments, a one-click filmmaking approach can be applied to convert a text script to an animated film as fast as a common one-click experience brings.

The hyperstory apparatus 200 can present the determined media stream of the alternative story (S408). The output media scheduler 204 is configured to dynamically schedule the media streams according to the decision of storytelling engine, and pass the proper media stream to be presented to the user. Using the hyperstory representation in FIG. 6 as an example, assume the current story being presented corresponds to the solid line path and that the dashed line path is selected as the target path, the output media scheduler 204 can schedule to play the media stream of the story segment (221201) at step 2, followed by the media stream of the story segment (001202) corresponding to the alternative story at step 3.

In some embodiments, the hyperstory apparatus 200 can present a feedback message about a remaining time until the story trend change occurs (S410). The remaining time is a duration between the current playback progress and a time that the shared story segment of the current story and alternative story ends. This is used to notify the user about when (e.g., 1 minutes later) the story trend change is going to occur. The feedback message is presented before the story trend change takes place, the hyperstory apparatus 200 can explicitly make user aware that the change is coming and by when the change is going to occur. Using the hyperstory representation in FIG. 6 as an example, assume the current story being presented corresponds to the solid line path and that the dashed line path is selected as the target path, the remaining time until the story trend change occurs is a time duration between a current time and the playback progress of the media stream of the story segment (221201) ends. Once the media stream of the story segment (221201) is finished playing, the story trend change occurs and the media stream of the story segment (001202) corresponding to the alternative story is played. The feedback message may be in any proper form, such as an audible message or a visible message. For example, for a device with an associated screen, the screen can show something like "Requested change occurs in XX seconds/minutes". The XX can be refreshed at certain intervals, e.g., each minute, each second, etc. For a device without screen but with audio, the hyperstory apparatus 200 can either notify the user via their mobile phone that communicates with the story player 220, or use the embedded audio output to notify user: "Requested change occurs in XX seconds." In some embodiments, the audio message may be played multiple times and the countdown time in the audio message is changed each time the audio message is played according to the current playback progress. For example, the messages played at different playback progress may be "Requested change occurs in 5 minutes", "Requested change occurs in 2 minutes", "Requested change occurs in 30 seconds".

In some embodiments, the hyperstory apparatus 200 may monitor whether a cancelation request is received before the story trend change occurs (S412). For example, as long as the story trend change has not occurred yet, the user have the option of performing another one-click action to cancel the earlier request of changing story trend. When the cancelation request is received, the hyperstory apparatus 200 can continue presenting media streams of the current story (S414). Using the hyperstory representation in FIG. 6 as an example, the output media scheduler 204 can schedule to play the media stream of the story segment (221201) at step 2, followed by the media stream of the story segment (221202) corresponding to the original story at step 3.

The rewind function of the hyperstory apparatus 200 can work well in the disclosed process. When rewind, the current story can go back inversely according to the playback path. If the current story is an original story, the user can go back to a previous spot of choice and request a story trend change with one click. If the current story is an alternative story and the user regrets on an earlier executed one-click action to change the story trend, he/she can rewind back to a spot before the story trend change occurs and conduct a one-click action to cancel the earlier request. In some embodiments, when the fast forward function is triggered, the hyperstory apparatus 200 can follow a current story path for the fast-forwarding. In some embodiments, the one-click action for changing the story trend and/or the one-click action for canceling the story change may not be responded during the fast-forwarding and/or rewinding process.

Figure 8:
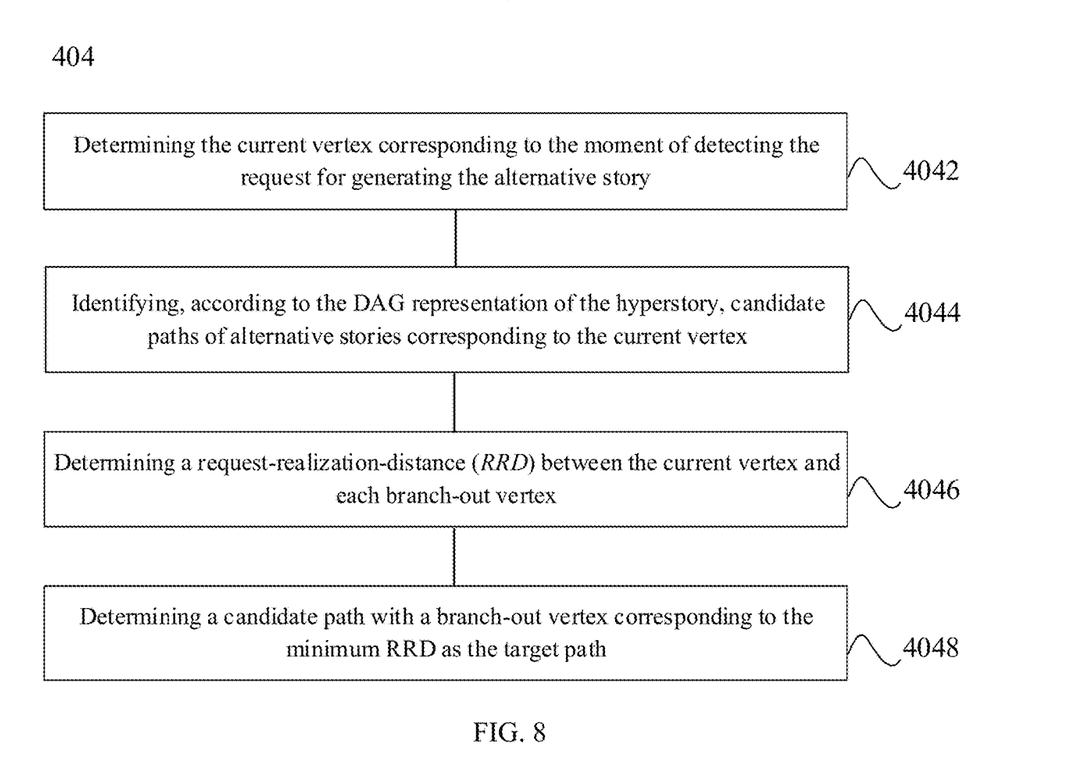
FIG. 8 is a schematic flow chart of a target path determination process consistent with certain embodiments of the present disclosure.

FIG. 8 is a flow chart of a target path selection process (S404) consistent with some embodiments of the present disclosure. The target path selection process is performed based on the DAG representation of the hyperstory. In the DAG representation, each vertex corresponds to a media stream of a story segments that describes certain status of the story character(s). Different vertices may describe different status of the story character(s). The path that connects the vertices represents a story trend that reflects developments and changes occurred to the status of the story character(s).

At 4042, a current vertex $V_{x,y}$ corresponding to a moment of detecting the single action for changing story trend is determined. Here, x denotes one of the N steps, and y denotes an index of the current vertex among vertices at step x. The current vertex is in a current path corresponding to a current story being presented.

At 4044, candidate paths of alternative stories corresponding to the current vertex are identified in the hyperstory. Each candidate path share one or more vertices with the current path and branches out at a branch-out vertex $V_{rx,ry}$.

At 4046, a request-realization-distance (RRD) between the current vertex and each branch-out vertex is determined to evaluate the candidate paths. The RRD function dynamically measures a distance between the change request and the realization process according to the transmission from one vertex to another in the DAG space. RRD considers the dissimilarity degree of the current story path and the candidate story path, the personalized preference of the user, the latency between requesting and realization, and so on. With the RRD function, the problem of identifying a target path from the candidate paths can be converted to an easier problem of finding minimum value for a list of distance (e.g., distances between vertex pairs like AP, AQ, AS shown in FIG. 7).

In some embodiments, the RRD between the current vertex and a branch-out vertex can be determined according to at least one of a media duration between a story segment of the current vertex and a story segment of the branch-out vertex, a user preference level of a candidate path that includes the branch-out vertex, or a dissimilarity degree between the current path and the candidate path.

For example, a minimum media duration between the current vertex and each branch-out vertex in the candidate paths is calculated. $T(V_{x,y}, V_{x+1,yy})$ denotes a media session duration for the current story segment (i.e., the show performance time). For a vertex pair denoted as $V_{x,y}$ and $V_{rx,ry}$(rx>x+1), i.e., two vertices connected with a path but not directly connected, $T(V_{x,y}, V_{rx,ry})$ can be calculated recursively using equation (1) to identify a minimum time period in candidate paths.

$$T(V_{x,y}, V_{rx,ry}) = \mathrm{Minimum}[T(V_{x,y}, V_{x+1,yy}) + T(V_{x+1,yy}, V_{rx,ry})] \text{ for all vertices } V_{x+1,yy} \text{ directly connected to } V_{x,y} \quad (1)$$

In addition, a dissimilarity degree between the current path and each candidate path is calculated according to the current vertex and the corresponding branch-out vertex. $D(V_{x,y}, V_{rx,ry})$ denotes a dissimilarity degree between the current path starting from $V_{x,y}$, and a candidate path ending at $V_{rx,ry}$, and the dissimilarity degree can be calculated recursively using equation (2):

$$D(V_{x,y}, V_{rx,ry}) = \mathrm{Minimum}[d(\mathrm{Next}(V_{x,y}), V_{x+1,yy}) + D(\mathrm{Next}(V_{x,y}), V_{rx,ry})] \text{ for all vertices } V_{x+1,yy} \text{ on the path from } V_{x,y} \text{ to } V_{rx,ry} \quad (2)$$

Here, $d(V_1, V_2)$ denotes a function to calculate the characters' status dissimilarity between two nodes $V_1$ and $V_2$. As previously discussed, changing the status of a character can cause story path change. Accordingly, the function $d(V_1, V_2)$ can be used to measure the dissimilarity of two vertices containing respective characters' status.

Further, a user preference level of each candidate path is evaluated. The more the user uses the hyperstory apparatus, the better understanding of the hyperstory apparatus to aware the preference of user. When user uses 1-click request, which indicate that he/she is not comfortable with the current trend of the story, thus the characters' current status can be put into a training list, on the other hand, the story node without causing user's 1-click request means that the status is acceptable for user, thus by using these data for training, the hyperstory apparatus is able to understand what condition is potentially not preferred by user, thus a user preference function Q(V) can be utilized to help avoid entering a node that user does not prefer, and value of Q is normalized to the range of [0.0, 1.0]. In some embodiments, the function Q is updated during the whole process of a user using the hyperstory apparatus, which can learn a long-term preference of the user.

The RRD is a combination of the functions of T, D and/or Q. For example, when all three factors are considered, the following calculation process in equation (3) can be applied:

$$RRD(V_{x,y}, V_{rx,ry}) = a*D(V_{x,y}, V_{rx,ry}) + b*T(V_{x,y}, V_{rx,ry}) + (1-a-b)*[1-Q(V_{rx,ry})] \quad (3)$$

Here, a and b in the range of [0.0, 1.0] are parameters for adjusting the weight of components D, T and Q. In order to minimize RRD, the user preferences Q is maximized, and the path dissimilarity D and latency T are minimized. In an example embodiment, the RRD is positively related to the user preference level, and negatively related to the media duration and the dissimilarity degree.

At 4048, a candidate path with a branch-out vertex corresponding to the minimum RRD is selected as the target path.

When a new story and its associated media stream become available from the Reversible Hyperstory Generator and Media Generator, the functions T, and D in Eqs. (1) and (2) are recalculated and stored for all combinations of vertices in the DAG space.

When a 1-click request is received at a time close to vertex $V_{x,y}$: all vertices $V_{rx,ry}$ in the future L steps (L is a parameter configurable by the hyperstory apparatus) are considered, and the one vertex that can minimize RRD(w, $V_{x,y}, V_{rx,ry}$) in Eq. (3) is selected with the path of $P(V_{x,y}, V_{rx,ry})$ that minimize the joint function of D and T. In some embodiments, the latency for realization $T(V_{x,y}, V_{rx,ry})$ is notified to the user with or without the path dissimilarity level in a normalized data range of [0.0, 1.0].

In some embodiments, the hyperstory apparatus 200 may also provide a response-to-request confidence level of the alternative story corresponding to the target path. The response-to-request confidence level is an exemplary factor that can be determined according to at least one of the user preferences Q, the dissimilarity degree D between expected response and the actual response, and/or other constraints of available information.

Embodiments of the present disclosure provides a new story experience model, called 1-click reversible storytelling, for lean back user with natural curiosity and interest to engage with the story. For such model, the user can send a single action (called 1-click) to request the story to change trajectory from the current direction. To enable this capability, a novel mechanism called Request-Realization-Distance (RRD) is introduced to measure the relationship between any possible alternative path compared to the current story path, and find the best choice considering the dissimilarity between the two paths, the user's personal preference, and the latency between request and realization, and so on. The disclosed method can be applied to all kinds of IoT devices that deliver storytelling experiences.

The present disclosure also provides a computer readable medium. The computer readable medium can store instructions that, when executed by a computer, cause the computer to perform an interaction method consistent with the disclosure, such as, one of the examples interaction methods described above. The computer readable medium can include a non-transitory computer-readable storage medium, such as a random-access memory (RAM), a read only memory, a flash memory, a volatile memory, a hard disk storage, or an optical medium.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A method for reversible story, applied to a computing device, comprising:
    when presenting a media stream of a current story, detecting a request performed by a user for generating an alternative story corresponding to the current story;
    in response to the request for generating the alternative story, determining a target path in a hyperstory, the hyperstory including multiple paths corresponding to multiple stories that describe different status change trends of one or more story characters, and the target path sharing a same initial segment with a path of the current story in the hyperstory and including a branch point where a story trend change occurs, wherein the hyperstory is stored in a database in text format;
    determining a media stream of the alternative story according to the target path, the media stream including a plurality of media segments generated according to story nodes of the target path; and
    presenting the media stream of the alternative story,
    wherein the hyperstory is represented by a directed acyclic graph (DAG), and vertices of the DAG represent story segments describing different status of the one or more story characters, and determining the target path in the hyperstory comprises:
        determining the current vertex corresponding to the moment of detecting the request for generating the alternative story;
        identifying, according to the DAG representation of the hyperstory, candidate paths of alternative stories corresponding to the current vertex, each candidate path sharing one or more vertices with a current path of the current story and branches out at a branch-out vertex;
        determining a request-realization-distance (RRD) between the current vertex and each branch-out vertex, wherein the RRD between the current vertex and a branch-out vertex is determined according to at least one of a media duration between a story segment of the current vertex and a story segment of the branch-out vertex, a user preference level of a candidate path that includes the branch-out vertex, or a dissimilarity degree between the current path and the candidate path, and the RRD is positively related to the user preference level, and negatively related to the media duration and the dissimilarity degree;
    determining a candidate path having the minimum RRD as the target path.

2. The method according to claim 1, further comprising:
    after the target path is determined, presenting a feedback message about a remaining time until the story trend change occurs.

3. The method according to claim 2, further comprising:
    after the request for generating the alternative story is detected, receiving a cancellation request before the story trend change occurs;
    in response to the cancellation request, continuing presenting the media stream of the current story.

4. The method according to claim 3, wherein the cancellation request is a single action performed by the user.

5. The method according to claim 1, wherein the request for generating the alternative story is a single action.

6. The method according to claim 1, wherein the RRD is a weighted sum of the media duration, the user preference level, and the dissimilarity degree.

7. The method according to claim 1, further comprising:
    determining user preference levels for the candidate paths according to a training result on previous user actions corresponding to the hyperstory.

8. The method according to claim 7, wherein the training result is determined by:
    inputting status of a story node associated with a previous request for generating an alternative story is input to a training list as a negative training sample of the user preference level,
    inputting status of a story node without association with a previous request for generating an alternative story as a positive training sample of the user preference level, and
    determining the training result according to the negative training sample and the positive training sample.

9. A device for reversible story, comprising:
    a memory; and
    a processor coupled to the memory and configured to perform a plurality of operations comprising:
    when presenting a media stream of a current story, detecting a request performed by a user for generating an alternative story corresponding to the current story;
    in response to the request for generating the alternative story, determining a target path in a hyperstory, the hyperstory including multiple paths corresponding to multiple stories that describe different status change trends of one or more story characters, and the target path sharing a same initial segment with a path of the current story in the hyperstory and including a branch point where a story trend change occurs, wherein the hyperstory is stored in a database in text format;
    determining a media stream of the alternative story according to the target path, the media stream including a plurality of media segments generated according to story nodes of the target path; and
    presenting the media stream of the alternative story,
    wherein the hyperstory is represented by a directed acyclic graph (DAG), and vertices of the DAG represent story segments describing different status of the one or more story characters, and determining the target path in the hyperstory comprises:

determining the current vertex corresponding to the moment of detecting the request for generating the alternative story;

identifying, according to the DAG representation of the hyperstory, candidate paths of alternative stories corresponding to the current vertex, each candidate path sharing one or more vertices with a current path of the current story and branches out at a branch-out vertex;

determining a request-realization-distance (RRD) between the current vertex and each branch-out vertex, wherein the RRD between the current vertex and a branch-out vertex is determined according to at least one of a media duration between a story segment of the current vertex and a story segment of the branch-out vertex, a user preference level of a candidate path that includes the branch-out vertex, or a dissimilarity degree between the current path and the candidate path, and the RRD is positively related to the user preference level, and negatively related to the media duration and the dissimilarity degree;

determining a candidate path having the minimum RRD as the target path.

10. The device according to claim 9, wherein the plurality of operations further comprise:

after the target path is determined, presenting a feedback message about a remaining time until the story trend change occurs.

11. The device according to claim 10, wherein the plurality of operations further comprise:

after the request for generating the alternative story is detected, receiving a cancellation request before the story trend change occurs;

in response to the cancellation request, continuing presenting the media stream of the current story.

12. The device according to claim 11, wherein the cancellation request is a single action performed by the user.

13. The device according to claim 9, wherein the request for generating the alternative story is a single action.

14. The device according to claim 9, wherein the RRD is a weighted sum of the media duration, the user preference level, and the dissimilarity degree.

* * * * *